UNITED STATES PATENT OFFICE.

FREDERICK GEORGE ANNISON, OF LONDON, ENGLAND.

SHOW-BILL, POSTER, &c., AND METHOD OF PRODUCING SAME.

SPECIFICATION forming part of Reissued Letters Patent No. 11,467, dated January 22, 1895.

Original No. 508,497, dated November 14, 1893. Application for reissue filed October 9, 1894. Serial No. 525,400. Patented in England November 13, 1891, No. 19,710; in France August 20, 1892, No. 223,838; in Belgium August 22, 1892, No. 101,094, and in Canada September 1, 1894, No. 46,932.

*To all whom it may concern:*

Be it known that I, FREDERICK GEORGE ANNISON, lithographic printer, a subject of the Queen of Great Britain, residing at No. 218 Burdett Road, Bow, London, England, have invented certain new and useful Improvements in Show-Bills, Posters, &c., and in Methods of Producing the Same, (for which I have received Letters Patent in Great Britain, No. 19,710, dated November 13, 1891; in France, No. 223,838, dated August 20, 1892; in Belgium, No. 101,094, dated August 22, 1892, and in Canada, No. 46,932, dated September 1, 1894,) of which the following is a specification.

The object of my invention is to produce show bills, posters, tablets, wall decorations and similar articles by an improved process, which are waterproof, not being easily affected by rain, fog and other like atmospheric influences.

According to this invention, paper, linen, cotton or other fibrous or textile material suitable for use in show bills, posters, tablets, wall decorations and similar articles, is rendered waterproof by being impregnated with a solution of xylonite, celluloid, ivorine or the like. Ordinarily, an opaque or white solution of xylonite is employed, or, if the material is required to be used for transparencies, I use a transparent solution of xylonite. The fabric or article saturated on one or both sides with liquid xylonite is passed through a heated chamber to dry it, and also to evaporate the alcohol and camphor. It is then passed between hot rollers which apply pressure to the article, to make the surface sufficiently smooth.

The article thus produced is useful for many purposes. It is especially adapted to take impressions or decorations of any color, which are usually applied by a press of some kind.

After the required design is applied or printed on the material, prepared as above described, it is covered with a coat of transparent varnish.

In pressing the material between the hot rolls, the nap of the impregnated material, which otherwise would stick up in little xylonite-coated spires, is pressed flat, leaving a surface which adapts the article to receive the ink or substance employed in decorating it.

The process, it will be observed, includes the production of a surface peculiarly suitable for printing upon by saturating one or both sides of the material with a solution of xylonite, then drying it, and then rolling it down with hot rollers to make it smooth. The article so produced, differs, therefore, from an article in which xylonite is applied to the surface only of fibrous material, on which it forms merely a film.

I am aware that the surfaces of fabrics have been coated with cellulose, and also that fabrics having their surfaces covered with a thin layer of pasty collodion have been dried before receiving a second layer of collodion, and also that fabrics having successive layers of collodion successively dried have been ornamented by being passed through hot rollers which soften the layers to receive designs; but, so far as I am aware, fabrics have not heretofore been impregnated as hereinbefore described, with xylonite or its equivalent, and then dried and passed between hot rollers to press down the nap and adapt the fabric thus impregnated to receive impressions or designs from ordinary presses.

I claim as my invention—

1. The improved method herein described of producing show bills, posters, tablets, wall decorations and similar articles, which consists in impregnating fibrous material with xylonite by saturating one or both sides of the material with a solution of xylonite, then drying the same, and then passing it between hot rollers.

2. An improved article of manufacture consisting of a fibrous or textile material impregnated as described with xylonite, in contradistinction to being merely coated.

3. As an improved article of manufacture, a show bill, poster or the like, having a foundation of fibrous material impregnated as described with xylonite, ornamented with characters or designs, and having a coating of transparent varnish.

4. The improvement in the method of printing show bills, posters, and other similar articles likely to be exposed to atmospheric influences, which consists in impregnating textile material such as linen, cotton, and the like, with liquid xylonite, drying the same, then passing it between hot rolls, then passing the same through a printing press, and finally coating the printed article with transparent varnish, substantially as and for the purpose described.

5. As an improved article of manufacture, a show bill or poster, having, first, a foundation of textile material impregnated with xylonite, second, letters or characters on the surface thereof, and third, a coating of transparent varnish over said letters, or characters, substantially as and for the purposes described.

In testimony whereof I have hereunto signed my name.

FREDERICK GEORGE ANNISON.

Witnesses:
JAMES C. WOLFE,
FREDERICK I. PINE.